US012732567B2

(12) United States Patent
Rahman et al.

(10) Patent No.: US 12,732,567 B2
(45) Date of Patent: Sep. 8, 2026

(54) SYSTEMS AND METHODS FOR TRACKING USER ACCESS ACROSS WEB DOMAINS

(71) Applicants: Atlassian Pty Ltd., Sydney (AU); Atlassian US, Inc., San Francisco, CA (US)

(72) Inventors: Saidur Rahman, Sydney (AU); Xinyang Zhang, Sydney (AU)

(73) Assignees: ATLASSIAN PTY LTD, Sydney (AU); ATLASSIAN US, INC., San Francisco, CA (US)

( * ) Notice: Subject to any disclaimer, the term of this patent is extended or adjusted under 35 U.S.C. 154(b) by 152 days.

(21) Appl. No.: 18/213,791

(22) Filed: Jun. 23, 2023

(65) Prior Publication Data

US 2023/0336636 A1 Oct. 19, 2023

Related U.S. Application Data

(63) Continuation of application No. 17/359,363, filed on Jun. 25, 2021, now Pat. No. 11,689,633.

(51) Int. Cl.

*G06F 15/173* (2006.01)
*H04L 67/01* (2022.01)
*H04L 67/025* (2022.01)
*H04L 67/306* (2022.01)
*H04L 67/50* (2022.01)

(52) U.S. Cl.

CPC ............ *H04L 67/535* (2022.05); *H04L 67/01* (2022.05); *H04L 67/025* (2013.01); *H04L 67/306* (2013.01)

(58) Field of Classification Search

CPC ..... H04L 67/535; H04L 67/025; H04L 67/01; H04L 67/306; H04L 9/40

USPC ................................ 709/224, 203, 219, 223

See application file for complete search history.

(56) References Cited

U.S. PATENT DOCUMENTS 8,225,197 B1 * 7/2012 Szewczyk ............... G06F 9/451 715/241
10,693,972 B2 * 6/2020 Drasin .................. H04L 67/147
2006/0265495 A1 * 11/2006 Butler ..................... H04L 67/53 709/224

(Continued)

OTHER PUBLICATIONS

Gabryel, Marcin, et al. "Browser Fingerprint Coding Methods Increasing the Effectiveness of User Identification in the Web Traffic." Journal of Artificial Intelligence and Soft Computing Research, vol. 10, No. 4, Jun. 14, 2020, pp. 243-253., https://doi.org/10.2478/jaiscr-2020-0016. (Year: 2020).*

(Continued)

*Primary Examiner* — Kaylee J Huang

(74) *Attorney, Agent, or Firm* — Brownstein Hyatt Farber Schreck, LLP

(57) ABSTRACT

Systems and methods for cross-domain tracking of users are disclosed. Embodiments provide mechanism for a unique identifier generated for a first domain (also referred to as a cross domain identifier) and stored at the user device to be made available to a second domain via a cross domain identifier system (XID system) such that the second domain can also use the same unique identifier for the user. This way, a user is identified at multiple domains of the organization using a single unique identifier. Further, in case a user identifier cannot be provided from the first domain to the second, the unique identifier can be created based on a fingerprint of the user's browser.

23 Claims, 7 Drawing Sheets

(56) References Cited

U.S. PATENT DOCUMENTS

2007/0299857 A1* 12/2007 Gwozdz ................ G06F 16/957 707/999.102
2009/0037806 A1* 2/2009 Yang ....................... H04L 67/02 715/234
2009/0327421 A1* 12/2009 Fu ......................... G06F 16/958 709/204
2010/0198911 A1* 8/2010 Zhang ..................... H04L 67/01 709/224
2012/0011262 A1* 1/2012 Cheng ................. G06F 16/9574 709/229
2014/0372224 A1* 12/2014 Tawakol ................... G06F 7/00 705/14.66
2015/0052217 A1* 2/2015 Benguerah ......... G06Q 30/0251 709/217
2015/0262199 A1* 9/2015 Taylor ................ G06Q 30/0201 705/7.29
2016/0328780 A1* 11/2016 Macker ................. H04L 67/535
2017/0134512 A1* 5/2017 Wyatt ..................... H04L 67/75
2017/0142158 A1 5/2017 Laoutaris et al.
2017/0289642 A1* 10/2017 Bury ................... G06F 16/9535
2019/0068723 A1* 2/2019 Drasin .................... H04L 67/02
2019/0303446 A1* 10/2019 Franz .................... G06F 40/274
2021/0006579 A1* 1/2021 Correa Bahnsen .......................... H04L 63/1483
2022/0092148 A1* 3/2022 Ross ................... G06F 16/9577
2022/0405462 A1* 12/2022 Nahum ................. H04L 67/146

OTHER PUBLICATIONS

Marcin et al., “Browser Fingerprint Coding Methods Increasing the Effectiveness of User Identification in the Web Traffic,” Journal of Artificial Intelligence and Soft Computing Research, https://doi.org/10.2478/ jaiscr-2020-0016, vol. 10, No. 4, pp. 243-253, Jun. 14, 2020.

* cited by examiner

SYSTEMS AND METHODS FOR TRACKING USER ACCESS ACROSS WEB DOMAINS

CROSS-REFERENCE TO RELATED APPLICATION(S)

This application is a continuation patent application of U.S. patent application Ser. No. 17/359,363, filed Jun. 25, 2021 and titled "Systems and Methods for Tracking User Access Across Web Domains," the disclosure of which is hereby incorporated herein by reference in its entirety.

TECHNICAL FIELD

Aspects of the present disclosure are directed to networking technologies, and in particular to tracking user access across web domains.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Typically, when a user visits a website (or a web domain), the website tracks the user's activity on the website, e.g., to determine whether the user is a new user of the website or a repeat visitor. This information may be used for web-analytics, such as, determining the number of unique new visitors on a website, the number of repeat visitors, or the number of visitors that interact with particular content on the website.

In some examples, websites may track visitors by generating and storing cookies on user devices. A cookie may include a unique identifier for the user along with any other user specific information the website wishes to remember about the user. When the user returns to the website, the website may retrieve this cookie from the user device to identify the user (based on the stored unique identifier) and/or personalize the user experience (based on other user-specific information stored on the cookie) on the website.

Although return users can be identified on a website in this manner, it is often difficult to identify or track the same users when they visit other websites or domains.

SUMMARY

In certain embodiments of the present disclosure a computer-implemented method is disclosed. The method includes receiving webpage data at a user device for a first webpage hosted on a first web domain, the webpage data includes a web analytics module and a tracking module. The method further includes loading the tracking module and the web analytics module, and determining by the tracking module whether a cross domain identifier for the first webpage is available on the user device. In response to determining that the cross domain identifier for the first webpage is available on the user device, the method further comprises the tracking module retrieving the cross domain identifier from the user device and communicating the cross domain identifier to the web analytics module. In response to determining that the cross domain identifier for the first webpage is not available on the user device, the method comprises obtaining the cross domain identifier for the first webpage from a cross domain identifier system or generating the cross domain identifier based on a browser fingerprint of the user device and communicating the cross domain identifier for the first webpage to the web analytics module. The method also includes communicating, by the web analytics module, the cross domain identifier for the first webpage to a remote server.

In other embodiments of the present disclosure a user device is disclosed. The user device includes a processor (also referred to herein as a processing unit) and non-transitory computer readable memory comprising instructions. The instruction when executed by the processor cause the user device to: receive webpage data for a first webpage hosted on a first web domain, the webpage data comprising a web analytics module and a tracking module, and load the tracking module and the web analytics module. The tracking module is configured to: determine whether a cross domain identifier for the first webpage is available on the user device. In response to determining that the cross domain identifier for the first webpage is available on the user device, the tracking module is further configured to retrieve the cross domain identifier from the user device and communicate the cross domain identifier to the web analytics module. In response to determining that the cross domain identifier for the first webpage is not available on the user device, the tracking module is further configured to obtain the cross domain identifier for the first webpage from a cross domain identifier system or generate the cross domain identifier based on a browser fingerprint of the user device and communicate the cross domain identifier for the first webpage to the web analytics module. The web analytics module is configured to communicate the cross domain identifier for the first webpage to a remote server.

Figure 1:
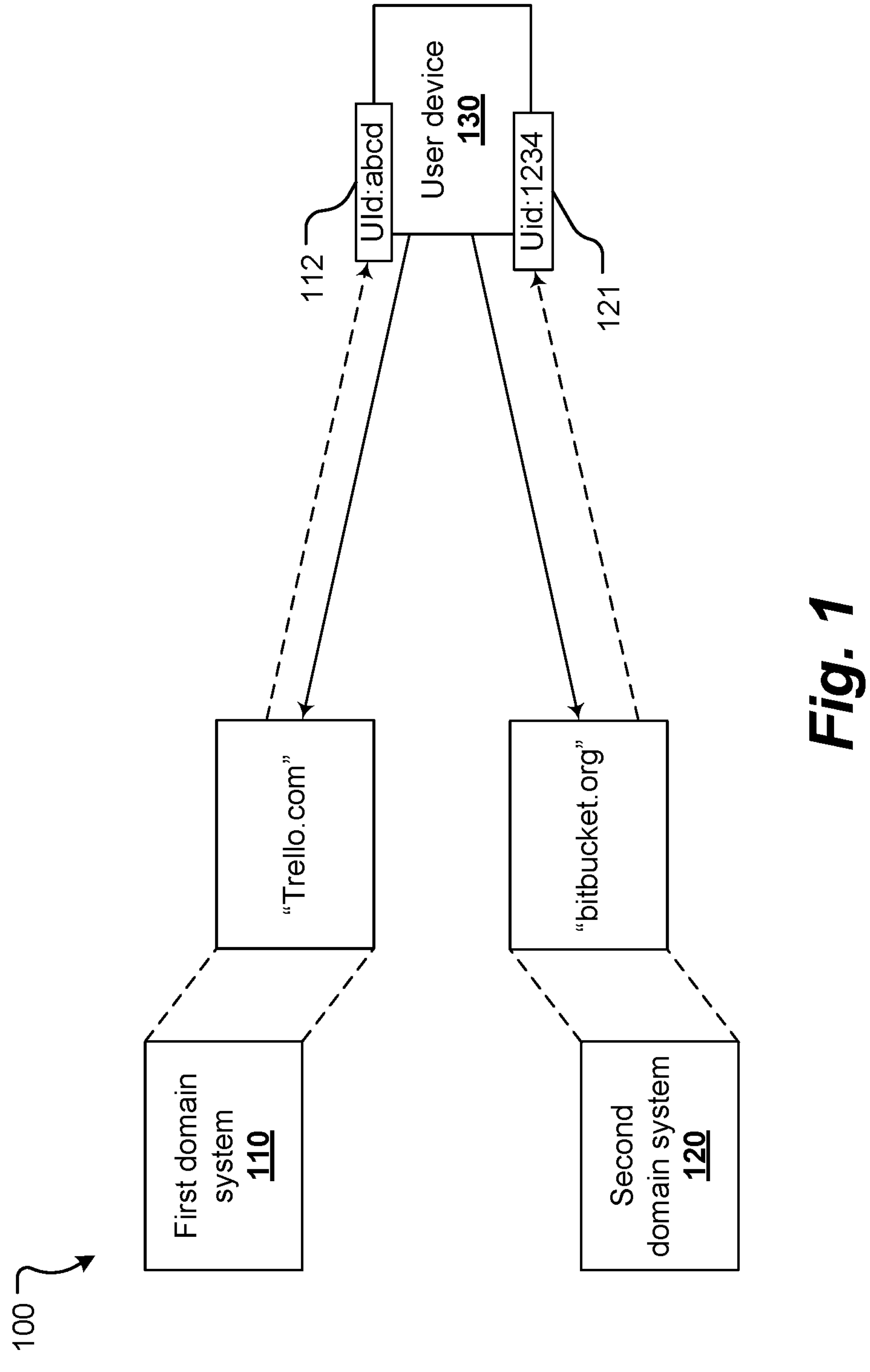
FIG. 1 is a block diagram illustrating a problem with existing techniques for assigning identifiers to users.

While the disclosed embodiments are amenable to various modifications and alternative forms, specific embodiments are shown by way of example in the drawings and are described in detail. It should be understood, however, that the drawings and detailed description are not intended to limit the embodiments to the particular form disclosed. The intention is to cover all modifications, equivalents, and alternatives falling within the spirit and scope of the present disclosure as defined by the appended claims.

DETAILED DESCRIPTION

In the following description, for the purposes of explanation, numerous specific details are set forth in order to provide a thorough understanding of the present disclosure. It will be apparent, however, that features of the present disclosure may be practiced without these specific details. In some instances, well-known structures and devices are shown in block diagram form in order to avoid unnecessary obscuring.

As described previously, websites (or web domains) often track users by generating and storing cookies on user devices. In the present context, a cookie is a small file (such as a text file) that allows a website server to store some data on a user device or read back data from the user device. Typically, a website may store user information such as a user ID, password, web page(s) visited, duration of stay, elements of the webpage interacted with, etc. When the user revisits the website, the website may obtain related information of the user by reading the cookie, and perform relevant operations such as displaying a welcome sign on a web page, or allowing direct user login without entering the ID and the password.

Generally speaking, cookies are proprietary and can only be read by a server of the domain that has generated the cookie. Stored pieces of information are saved in a form of name-value pairs, with each name-value pair being merely a named data and nothing more. A website can only obtain information that the website has placed on a user computer, but not information from other cookie files, or any other information in the user computer.

Accordingly, although return users can be identified on a website using cookies, it is often difficult to identify or track users when they visit other websites or domains.

For example, consider the situation of an organization that has multiple websites or domains directed to different products and/or services offered by the organization. Atlassian, Inc. is an example of such an organization. It maintains multiple domains; one domain being "trello.com" that publishes a website for a product management software it offers, another domain being "bitbucket.org" that publishes a website for a code management system and another domain being "atlassian.com" that publishes websites for multiple software development tools offered by the organization.

FIG. 1 illustrates such an example scenario where an organization has a first domain 110 (e.g., "trello.com") and a second domain 120 (e.g., "bitbucket.org"). In such cases, when a user visits a webpage of the first domain 110 (e.g., trello.com) using a user device (such as user device 130), the first webpage generates a first unique user identity (ID) for the user (e.g., uid=1234) and stores this ID in a first cookie 112 in the user device 130. Thereafter, when the user revisits the same webpage or visits another webpage of the first domain 110, the first domain 110 accesses the first cookie 112 stored in the user device 130 and identifies the user based on the first unique ID stored in the first cookie 112.

However, if the same user visits a webpage of the second domain 120 (e.g., bitbucket.org) using user device 130, the second domain 120 generates its own second unique ID (e.g., uid=abcd) for the user and stores this in a second cookie 121 in the user device 130. Thereafter when the user visits/revisits a webpage of the second domain 120, the second domain 120 accesses the second cookie 121 and identifies the user based on the second unique ID stored in the second cookie 121.

As will be appreciated, in such cases, the organization 100 cannot typically track the same user across the two domains 110 and 120 as each domain maintains a different user ID (e.g., 1234 and abcd) and cannot access the cookie generated and stored by the other domain on the user device 130. In other words, the trello.com domain cannot access the ID generated and stored by the bitbucket.org domain on the user device 130 and the similarly the bitbucket.org domain cannot access the ID generated and stored by the trello.com domain. Accordingly, organisations that have multiple domains may not be able to determine if the same user has visited several of the organization's domains and consequently cannot perform cross-domain web-analytics or provide personalized access to users across domains.

To overcome one or more of these issues, embodiments of the present disclosure provide systems and methods for cross-domain tracking of users. In particular, the present disclosure provides systems and methods for identifying the same user across multiple domains.

To this end, embodiments of the present disclosure provide a mechanism for a unique identifier generated for a first domain (also referred to as a cross domain identifier in this disclosure) and stored at the user device to be made available to a second domain such that the second domain can also use the same unique identifier for the user. This way, a user is identified at multiple domains of the organization using a single unique identifier. As domains cannot directly access content stored by other domains on the user device, aspects of the present disclosure provide a mechanism for the user identifier stored by one domain on the user device to be made available to other domains on the user device via an intermediate cross domain identifier system (also referred to as XID system in this disclosure). Further, in case a user identifier cannot be provided from the first domain to the second, according to aspects of the present disclosure, the unique identifier can be created based on a fingerprint of the user's browser. If both domains utilize the same algorithm to obtain the browser fingerprint and generate the user identifier, both domains will generate the same user identifiers, which can aid in tracking the user across both domains. These and other aspects of the present disclosure will be described in detail in the following sections.

Figure 2:
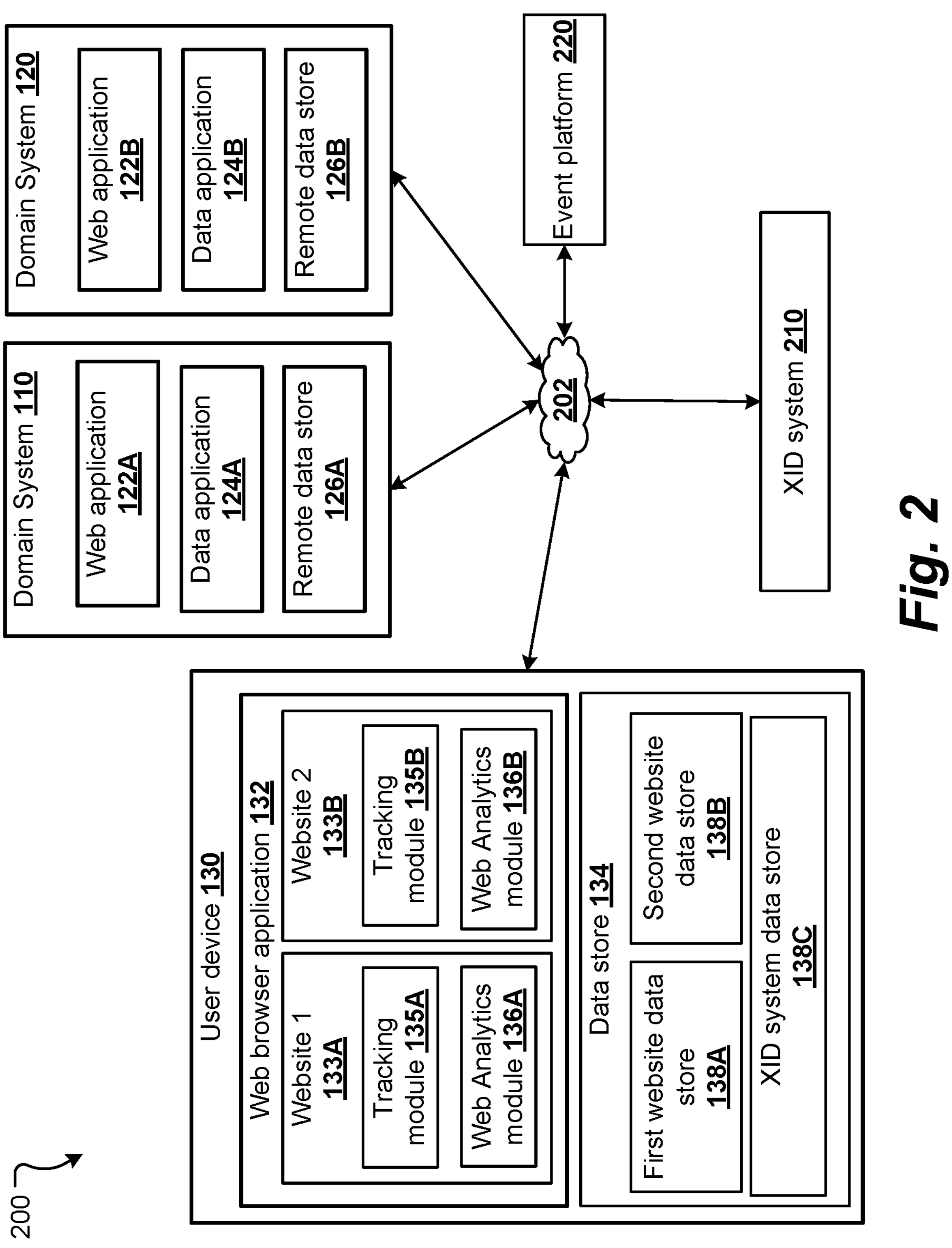
FIG. 2 is a block diagram of a networked environment according to aspects of the present disclosure.

FIG. 2 illustrates an example environment 200 in which embodiments and features of the present disclosure are implemented. Specifically, FIG. 2 illustrates the systems involved in tracking a user across multiple domains. The systems include a first domain system 110, a second domain system 120, a user device 130, an XID system 210, and an event platform 220. These systems communicate with one another over one or more communication networks 202.

A user of the user device 130 may visit websites 133A, 133B hosted by the first and second domain systems 110, 120, respectively. In concert with the XID system 210, the website that the user visits first (e.g., website 133A) generates and stores a unique identifier for the user on the user device 130. Subsequently, when the user visits website 133B provided by the second domain system 120, website 133B retrieves the unique identifier generated when the user visited the first website (with the help of the XID system 210) and uses this identifier to identify the user. In this manner, the same user identifier is utilized across the domains to identify the user. Each of the systems in environment 200 is described in the following sections.

Each domain system 110, 120 may be a system or set of systems configured to provide a particular type of service/perform particular types of operations for client devices. As one example, domain system 110 may be an issue tracking system used (inter alia) to create, manage, and track issues, and domain system 120 may be software code management system used to create, manage, and deploy software code. These are obviously just examples of possible products/functionalities offered by the domain systems and in actual implementation the domain systems 110, 120 may offer these or any other products/functionalities without departing from the scope of the present disclosure.

In order to provide the required functionality, each domain system in environment 200 includes a web server application 122A and 122B, a data server application 124A and 124B, and a remote data store 126A and 126B.

The web server application 122A or 122B configures the domain system 110 or 120 (respectively) to provide server side functionality for clients—for example web browsers (such as 132) running on user devices (such as user device 130). This involves receiving and responding to requests from client web browsers 132. While domain systems 110, 120 have been illustrated with single web server applications 122A and 122B, they may provide multiple server applications.

The data server application 124A and 124B is used (e.g. by the corresponding web server applications 122A and 122B) to retrieve data from and write data to the remote data stores 126A and 126B (i.e., physical memory on which data is stored). Data server application 124A or 124B may be any appropriate data server, for example a SQL server or the like. While a single remote data store 126A and 126B is shown, domain systems 110 and 120 may provide multiple data stores. For example, domain system 110 may maintain one data store for storing field values and another data store for storing field configuration data.

Web server applications 122A and 122B and the corresponding data server applications 124A and 124B may run on the same physical computer systems or separate physical computer systems that are in communication (e.g. via a direct or networked connection). Similarly, data server applications 124A and 124B may connect to corresponding remote data stores 126A and 126B directly or via a network (e.g., a local area or other network).

In certain embodiments, the domain systems 110, 120 are scalable systems. Depending on demand from clients (and/or other performance requirements), compute nodes can be provisioned/de-provisioned on demand. As an example, if there is high client demand additional server applications 122A or 122B may be provisioned to cater for that demand. In this case, each functional component of the domain systems 110, 120 may involve one or several applications running on the same or separate computer systems, each application including one or more application programs, libraries, Application programming interfaces (APIs), or other software that implements the functionality described herein.

The user device 130 may be any suitable device, for example a mobile device (e.g. a tablet or mobile phone), a portable device (such as laptop computer), or any other computing device (e.g. a desktop computer).

As illustrated in FIG. 2, the user device 130 includes one or more client applications (e.g., browser applications 132) that are configured to provide client-side functionality of the domain systems 110, 120. In particular, the web browser application 132 presents web resources such as website 133A or website 133B from the first or second domain systems 110, 120 respectively, e.g., by accessing the corresponding web application 122A or 122B via an appropriate uniform resource locator (URL) and communicating with the web application 122A or 122B via general world-wide-web protocols (e.g. HyperText Transfer Protocol (HTTP), File Transfer Protocol (FTP)). Examples of browser applications 132 include Chrome, Safari, Internet Explorer, Opera, etc. Further, a given user device 130 may have more than one web browser 132, for example it may have two or more types of web browsers.

A web browser has six main components (not shown)—a user interface, a browser engine, a rendering engine, networking module, user interface backend, and a JavaScript interpreter. The user interface includes parts of the browser display, such as the address bar (where a user can enter a URL of the webpage/website the user wishes to view), back/forward buttons, etc. The browser engine organizes actions between the user interface (UI) and the rendering engine and the rendering engine is responsible for displaying the requested content. When a website such as website 133A is requested, the rendering engine analyses received files and renders the analysed content on the screen (using the processes described earlier). The user interface backend is used to draw or paint basis widgets like combo boxes and windows and the JavaScript Interpreter is used to parse and execute JavaScript code—such as libraries or other modules including tracking modules 135A or 135B and web analytics modules 136A or 136B.

In addition to these six components, the web browser 132 also includes a data store 134, which is a persistent layer where the web browser 132 saves data locally. In particular, the web browser 132 may store website specific data in the data store 134, such that a given website, e.g., website 133A can only store and retrieve data from the data store 134 that is specific to that website and cannot access data stored against any other websites. This is depicted as first website data store 138A (that is used to store data for website 133A) and second website data store 138B (that is used to store data for website 133B). In addition, the data store 134 may include specific storage for the XID system 210, which is depicted in FIG. 2 as XID data store 138C.

In addition to providing client-side functionality of the first and second domain systems 110, 120, the web browser 132 can provide client-side functionality for the XID system.

In response to a user request, the web browser application 132 may request data for website 133A and/or website 133B from the first and/or second domain system 110, 120 and may render website 133A and/or 133B on the user device 130. Typically, webpage data is in the form of a Hypertext Mark-up language (HTML) document and the HTML document includes the actual content and structure for the website along with the style elements such as cascading style sheet (CSS) elements that specify the styling of the web page (including background color, layout, font, etc.). In addition, the HTML document may include one or more scripts (such as JavaScript programs).

In the present disclosure, examples of JavaScript programs include the tracking modules 135A and 135B and web analytics modules 136A and 136B. Tracking modules 135A, 135B, and the web analytics modules 136A, 136B may be received at the user device 130 in the form of JavaScript code, which is parsed and executed by the web browser,'s JavaScript Interpreter.

Once the tracking module 135A, 135B is parsed and compiled, it may perform one or more functions to enable cross domain tracking. For instance, it may determine whether a cross domain identifier (XID) for the user is available in the corresponding website data store 138A or 138B. If the cross domain identifier is available, the tracking module 135A, 135B may be configured to retrieve this cross domain identifier from the corresponding data store 138A, 138B and communicate it to the corresponding web analytics module 136A, 136B. If the cross domain identifier is not available (e.g., in the corresponding website data store), the tracking module may be configured to communicate with the XID system 210 to get a cross domain identifier, store it in its website specific data store and communicate it to the corresponding web analytics module 136. Further, in some embodiments, if for some reason the tracking module 135A, 135B is unable to obtain a cross domain identifier from the XID system 210, it may be configured to generate its own cross-domain identifier (based on a digital fingerprint of the web browser 132) and store the cross-domain identifier in the corresponding website specific data store 138A, 138B.

As used in the present disclosure, browser fingerprinting is a technique used to identify a web browser. Essentially, to create a browser fingerprint, a web browser is queried to receive certain information about the browser, such as its user agent string (i.e., information that helps identify the browser being used, the version of the browser being used, and the operating system on which the web browser is installed), screen colour depth, language, time zone offset and other capabilities, such as local storage and session storage. These values associated with the web browser are passed through a hashing function to produce a fingerprint, which can be used as a cross domain identifier in the present disclosure.

The web analytics module 136A, 136B once interpreted and executed may be configured to detect events on the corresponding website 133A, 133B as the user interacts with the website, create event logs, and communicate these event logs to the event platform 220. Further still, the web analytics module 136A. 136B may be configured to receive cross domain identifiers from the corresponding tracking module 135A, 135B and add these identifiers to the created event logs. In certain embodiments, the web analytics module 136A, 136B may be configured to add the cross domain identifiers to certain events detected on the corresponding webpage, such as screen, user interface, operational and identify events. A screen event is fired when a user navigates to a particular screen, tab, drawer, modal, or inline-dialog on a website. A user interface event is fired when a user interacts with a user interface element such as a button, text field, or link. These events enable developers to see how users are performing certain tasks on the website. An operational event helps measure usages or performance of implementation detail. These events are not used to measure user actions, but rather help identify whether web page features are functioning correctly. An identify event tracks user logins.

While a single user device 130 has been depicted in FIG. 2, environment 200 will typically include multiple user devices, each configured to interact with the other systems in environment 200 via one or more communication networks 202.

The XID system 210 may be configured to generate cross domain identifiers, store the cross domain identifier in the XID data store 138C and pass the cross domain identifier to a requesting website (e.g., website 133A, 133B) on the user device 130. If the XID system 210 determines that no cross domain identifiers exist in the data store 138C (e.g., because the user has not visited any of the domains in environment 200 as yet or data in the data store 134 has been wiped clean), it may be configured to generate a new cross domain identifier and pass the cross domain identifier to the tracking module 135.

In certain embodiments, the tracking module of a particular website calls the XID system 210 to pass and/or generate the cross domain identifier and the XID system 210 passes the retrieved or generated cross domain identifier to the tracking module, which stores the cross domain identifier in the corresponding website data store.

The event platform system 220 may be communicatively coupled to the domain systems 110, 120 and/or directly to the corresponding websites 133A, 133B (and in particular to the corresponding web analytics modules 136A, 136B) to receive event records. In certain embodiments, the event platform 220 is designed based on a publish-subscribe model. That is, the domain systems 110, 120 or websites 133A, 133B send event records to the event platform 220 and consumers subscribe to the event platform 220 to receive certain type of event data from the event platform, such as data related to websites visited, objects interacted with on a website 133, minutes spent on a website 133, etc. In this model, the publishers categorize the event data into classes without knowledge of which subscribers there may be. Similarly, subscribers express interest in one or more classes of event data and receive event data from the event platform 220 that is of interest to them. When the event platform 220 receives an event record, the event platform 220 matches the event record with the subscribers who are subscribed to the event and makes a copy of the event data for each subscriber and stores a copy to the subscriber's queue or stream. In this case, the domain systems 110, 120 or websites 133A, 133B may submit event data to the event platform 220 and website analytics systems (not shown) may subscribe to receive event data related to websites 133. Such analytics information may be used by the first and second domains to track user habits and interactions with their websites 133. While the event platform 220 has been illustrated as a single system, it may be provided by multiple servers (e.g. one or more web servers and one or more application servers). StreamHub® offered by Atlassian, Inc. is one example of such an event platform 220.

Communications between the various systems in environment 200 are via the communications network 202. Communications network 202 may be a local area network, public network (e.g. the Internet), or a combination of both. For instance, communication between the web browser application and the corresponding web applications may be via a public network whereas the communication between the domain systems 110, 120 and the event platform 220 may be via a local area network without departing from the scope of the present disclosure.

While environment 200 has been provided as an example, alternative system environments/architectures are possible. For example, the event platform 220 may be part of the domain systems 110, such that each domain system includes its own event system. In these examples, an independent central event platform 220 may not be provided.

As described above, cross domain identifiers are stored in website specific data stores 138. Cross domain identifiers may be of two types—obtained from the XID system 210 or generated based on a digital fingerprint of the web browser 132. Further, the cross domain identifier may be stored on the user device 130 in two ways—as a cookie or in the website specific data store 138.

In either case, some information about the cross domain identifier is stored either in a cookie in the data store 134 or as part of the website local data store 138. In certain embodiments, the following information may be stored for each cross domain identifier—

State: this field indicates the state of the cross domain identifier. Possible values of the state include one or more of new, changed, existing, timeout, error, unavailable, or malformed. An existing state indicates whether the cross domain identifier existed previously (e.g., in a different website data store before it was stored in a particular website data store). A 'new' state indicates that the cross domain identifier has been newly created. A 'changed' state may indicate that the cross domain identifier has changed to a new value from a previous value. This may happen if the previous cross domain identifier has expired. A 'timeout' state may indicate that the request to the XID system 210 for the cross domain identifier timed out before the XID system 210 could communicate the identifier back to the tracking module 135. "Error," "unavailable" or "malformed" states may indicate some situation that has led to no cross domain identifier being available at the website data store 138.

Type: this field indicates whether the cross domain identifier was obtained from the XID system 210 or generated based on a digital fingerprint. In one example, a cross domain identifier obtained from the XID system 210 may be referred to as 'XC' whereas a cross-domain identifier generated based on a browser fingerprint may be referred to as a 'UID'.

Value: this field includes the value of the cross-domain identifier (if available)

Created at/date: this field indicates the date and time at which a particular cross domain identifier is first stored in a website data store 138.

Table A below shows two examples of cross domain identifiers. In the first example, the cross domain identifier is obtained from the XID system 210 (as indicated by the type 'XC') and the in second example the cross domain identifier is generated based on browser fingerprinting (as indicated by the type 'UID'). As shown in the examples below, the information stored for a cross domain identifier that is based on browser fingerprint may also include a field indicating the amount of time taken to generate the cross domain identifier (see "timeTaken" field in the second example. It will be appreciated that this field may also be present for other types of cross domain identifiers without departing from the scope of the present disclosure.

TABLE A

Cross domain identifier examples

```
[
  {
    "state": "EXISTING",
    "type": "xc",
    "value": "673b24f9-8a78-4be8-af38-56f7173dd801",
    "createdAt": "2020-10-12T01:28:03.080Z"
  }
]
[
  {
    "state": "NEW",
    "type": "uid",
    "value": "2bfde7ad038264b22a9cf74479bde58a",
    "createdAt": "2021-05-21T04:21:54.298Z",
    "timeTaken": 455.98500000778586
  }
]
```

The features and techniques described herein are implemented using one or more computer processing systems.

For example, in networked environment 200 described above, user device 130 is a computer processing system (for example, a personal computer, tablet/phone device, or other computer processing system). Similarly, the various functions performed by the domain systems 110, 120, the XID system 210 and the event platform 220 are performed by one or more computer processing systems (e.g. server computers or other computer processing systems).

Figure 3:
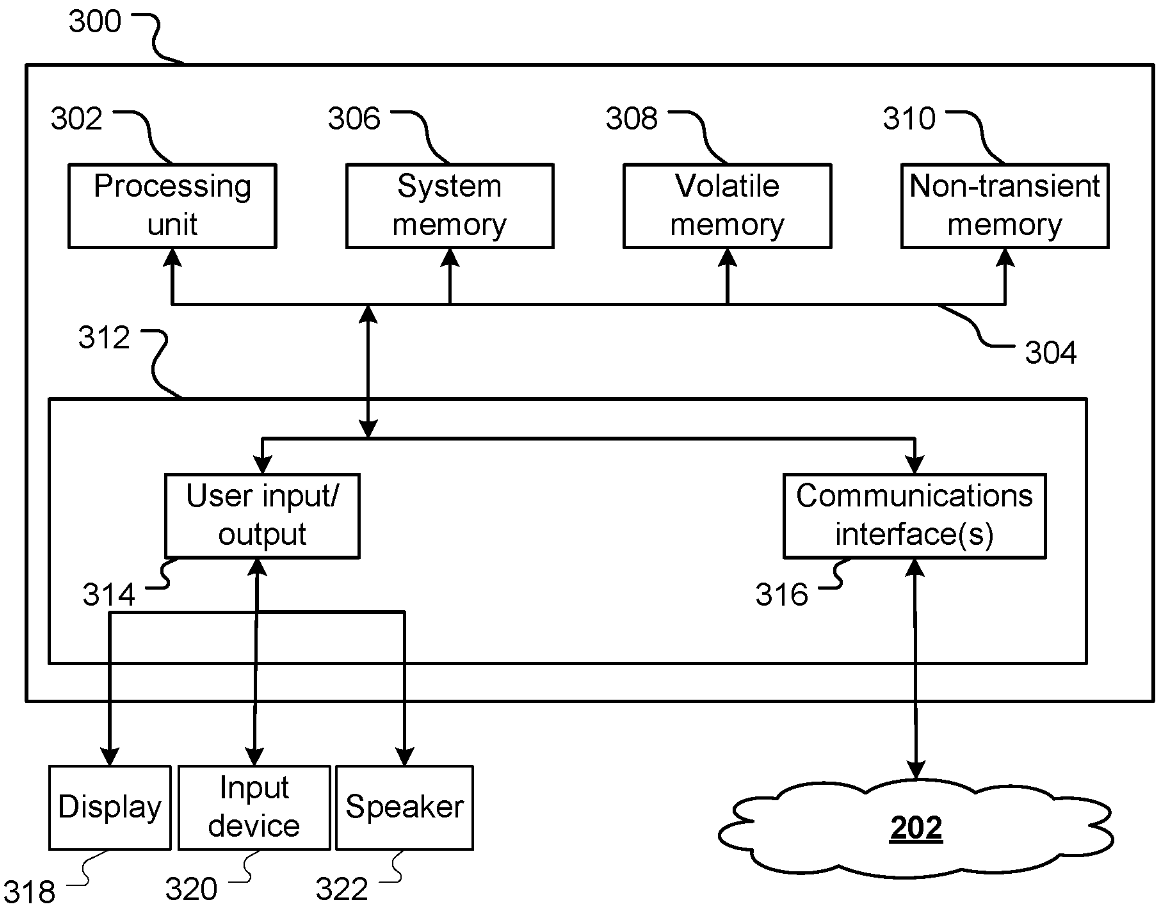
FIG. 3 is a block diagram of a computing system with which various embodiments of the present disclosure may be implemented.

FIG. 3 provides a block diagram of a computer processing system 300 configurable to perform various functions described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304 the processing unit 302 is in data communication with a one or more machine readable storage (memory) devices, which store instructions and/or data for controlling operation of the processing system 300. In this example system 300 includes a system memory 306 (e.g. a BIOS), volatile memory 308 (e.g. random access memory such as one or more DRAM modules), and non-transitory memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. Wireless connection with other devices/networks may similarly be by any appropriate standard or proprietary hardware and communications protocols.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input/output devices 314 by which information/data is input into (received by) or output by system 300. Such input devices may include keyboards, mice, trackpads, microphones, accelerometers, proximity sensors, positioning devices and the like. Examples of output devices include devices such as a display, speakers, vibration modules, LEDs/other lights, and such like. System 300 may also include or connect to devices which may act as both input and output devices, for example memory devices (hard drives, solid state drives, disk drives, compact flash cards, and the like) which system 300 can read data from and/or write data to, and touch screen displays which can both display (output) data and receive touch signals (input).

By way of example, where system 300 is a user device system such as user device 130 it may include a display 318 (which may be a touch screen display), an input device 320 (e.g. a mouse, trackpad, keyboard, or other pointing device), and a speaker device 322.

System 300 also includes one or more communications interfaces 316 for communication with a network, such as network 202 of environment 200 (and/or a local network within the first and second domain systems 110, 120, XID system 210 or event platform 220). Via the communications interface(s) 316, system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transient machine readable medium accessible to system 300. For example, instructions and data may be stored on non-transitory memory 310. Instructions and data may be transmitted to/received by system 300 via a data signal in a transmission channel enabled (for example) by a wired or wireless network connection over interface such as interface 312.

Applications accessible to system 300 will typically include an operating system application. System 300 also stores or has access to applications which, when executed by the processing unit 302, configure system 300 to perform various computer-implemented processing operations described herein. For example, and referring to the networked environment of FIG. 2 above: user device 130 includes a web browser client 132 which configures the user device 130 to perform various operations described herein, first and second domain systems 110, 120, have web applications 122A, 122B which configure the domain systems 110, 120 to perform various operations described herein, and the XID system and event platform include applications which configure the respective systems to perform the operations describes herein.

Figure 4:
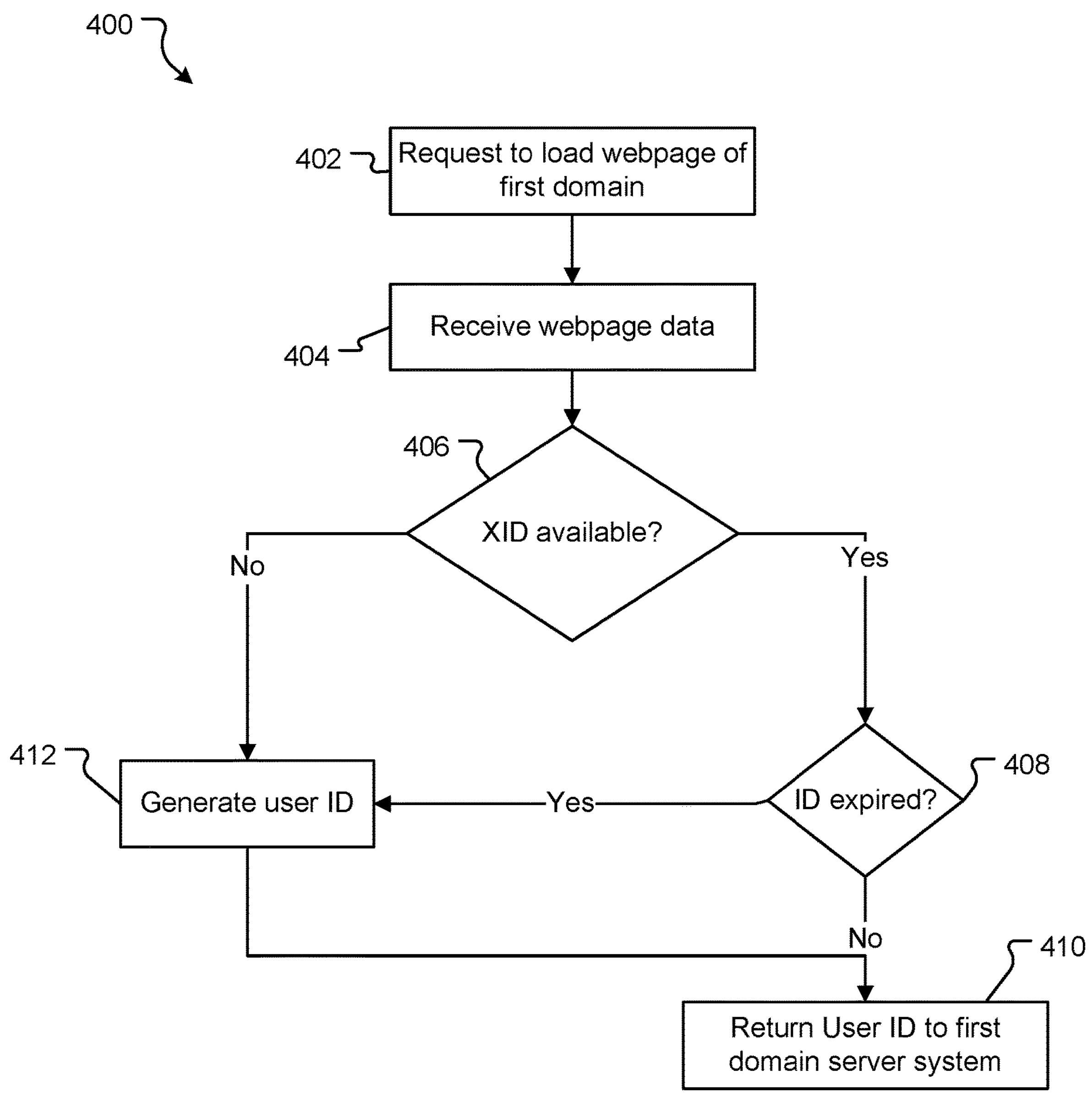
FIG. 4 is a flowchart illustrating an example method for cross domain tracking of a user according to some aspects of the present disclosure.

Various methods for generating cross domain identifiers and tracking users across domains will now be described. In particular, FIG. 4 describes a high-level method 400 of tracking a user across domains, FIG. 5 describes a method 500 of receiving/generating a cross-domain identifier at a tracking module and FIG. 6 describes a method 600 for generating a cross-domain identifier at an XID system 210 according to some aspects of the present disclosure.

Method 400 is described with respect to the systems shown in FIG. 2. In particular, in this example, it is assumed that a user utilizes user device 130 to visit a website 133A hosted by domain system 110. It will be appreciated that this example is used simply to aid in understanding the invention and that the method remains the same if the user visits a webpage hosted by any other domain system in environment 200, such as domain system 120.

The method 400 commences at step 402, where the web browser 132 communicates a web page request to the domain system 110. In some cases, a user may enter a website URL in a search bar of the web browser 132 or select a particular website from a list of search results displayed within the web browser user interface. The website request includes a URL or any other identifier of the website. For instance, the website request may be as follows (periods removed from URL)—

HTTP GET www.trello.com

At step 404, the web browser 132 receives data for the requested website 133A from the domain system 110. Typically, website data is in the form of an HTML document and the HTML document includes the actual content and structure for the website 133A along with the style elements such as cascading style sheet (CSS) elements that specify the styling of the website (including background color, layout, font, etc.). In addition, the HTML document includes libraries or JavaScript components for the tracking module 135A and the web analytics module 136A.

In certain embodiments, this website content is stored in the remote data store 126A. In such cases when the web application 122A receives the website request, it requests the data application 124A to retrieve the requested web content from the data store 126A. In other embodiments, the web application 122A may store website content in a cache for quick retrieval. In such cases, it does not have to communicate with the data application 124A to retrieve the data and can respond to the web page request rather quickly. In either case, once the web application 122A has the website content, it passes the website content to the requesting web browser 132.

Upon receiving the website content, the web browser 132 parses the HTML document to identify the JavaScript components and passes these to the JavaScript interpreter to compile/execute. It also renders the website 133A based on the HTML text and the CSS elements. In particular, the JavaScript interpreter executes the web analytics module 136A and the tracking module 135A. In some embodiments, the execution of these modules 136A may be performed in parallel with the rendering of the content of website 133A and the tracking and web analytics modules may perform their functions in the background while the user interacts with the website 133A in the foreground.

At step 406, the tracking module 135A determines if a cross domain identifier exists. To this end, the tracking module 135A may check if one or more cookies for the website 133A are present in the data store 134 and/or inspects the website's data store 138A to check if a cross domain identifier is stored. If the user had previously visited website 133A and a cross domain identifier was successfully stored in a cookie or in the data store 138A for this website, the tracking module 135A determines that a cross domain identifier exists for the website 133A at step 406 and the method proceeds to step 408.

At step 408, the tracking module 135A determines if the cross domain identifier has expired. In some examples, the cross domain identifier may be valid for a certain period and may expire thereafter. When the cross domain identifier is generated by the XID system 210 the identifier does not tend to change over time unless the user clears the cookie/browser data. Accordingly, if the cross domain identifier is generated by the XID system 210 it may be set to expire after a longer period, such as every 30 days or to never expire. A cross domain identifier generated based on browser fingerprint on the other hand is more likely to change more frequently. This may happen, for example, because of browser upgrade, language, font, or extension changes. Accordingly, if the cross domain identifier is generated based on browser fingerprint is may be set to expire after a short period, such as every 7 days or fortnight. In certain embodiments, the tracking module 135A maintains these predetermined expiry period for both types of cross domain identifiers. In other embodiments, the expiry date of a cookie or cross domain identifier stored in the data store 138A may be specified within the cookie or data store itself.

In the present example, it is assumed that the time to live or expiry periods of the two types of cross domain identifiers are different and that these expiry periods are known to the tracking module 135A.

At step 408, in order to determine whether the cross domain identifier has expired, the tracking module 135A may be configured to inspect the 'type' field of the cross domain identifier to determine whether the cross domain identifier is generated by the XID system 210 (e.g., if the type is 'xid') or based on browser fingerprinting (e.g., if the type is 'uid'). Based on this determination, the tracking module 135A determines the predefined expiry period. Subsequently, it may inspect the 'created at' or 'date' field of the cross domain identifier to check if the cross domain identifier has expired.

For example, if the cross domain identifier is based on browser fingerprinting, the expiry period for this type of identifier is 7 days from the creation day, and the creation date is determined to be more than 7 days before the current date, the tracking module 135A may determine that the cross domain identifier has expired. Alternatively, if the cross domain identifier is generated by the XID system 210, the expiry period is 30 days, and the creation date is determined to be 15 days before the current date, the tracking module 135A determines that the cross domain identifier has not expired.

At step 408, if the tracking module 135A determines that the cross domain identifier has not yet expired, the method proceeds to step 410, where the tracking module 135A returns the cross domain identifier to the web analytics module 136A to be added to event logs generated by the web analytics module 136A. In some embodiments, the tracking module 135A may also update the created at or date field of the cross domain identifier to the current date/time. This may be performed for cross domain identifiers that are created by the XID system 210, as these identifiers do not tend to change over time. By updating the created at/date field of the identifier each time it is retrieved, the tracking module 135A can help reduce the need for refreshing this identifier, which can in turn reduce the computational load on the web browser 132 and also reduce the amount of time taken to return the cross domain identifier.

Returning to steps 406 and 408, if at step 406 it is determined that a cross domain identifier does not exist or at step 408 it is determined that the cross domain identifier has expired, the method proceeds to step 412 where a cross domain identifier is generated. The process of generating the identifier is described in detail with respect to FIGS. 5 and 6.

Once the identifier is generated, the method proceeds to step 410.

Figure 5:
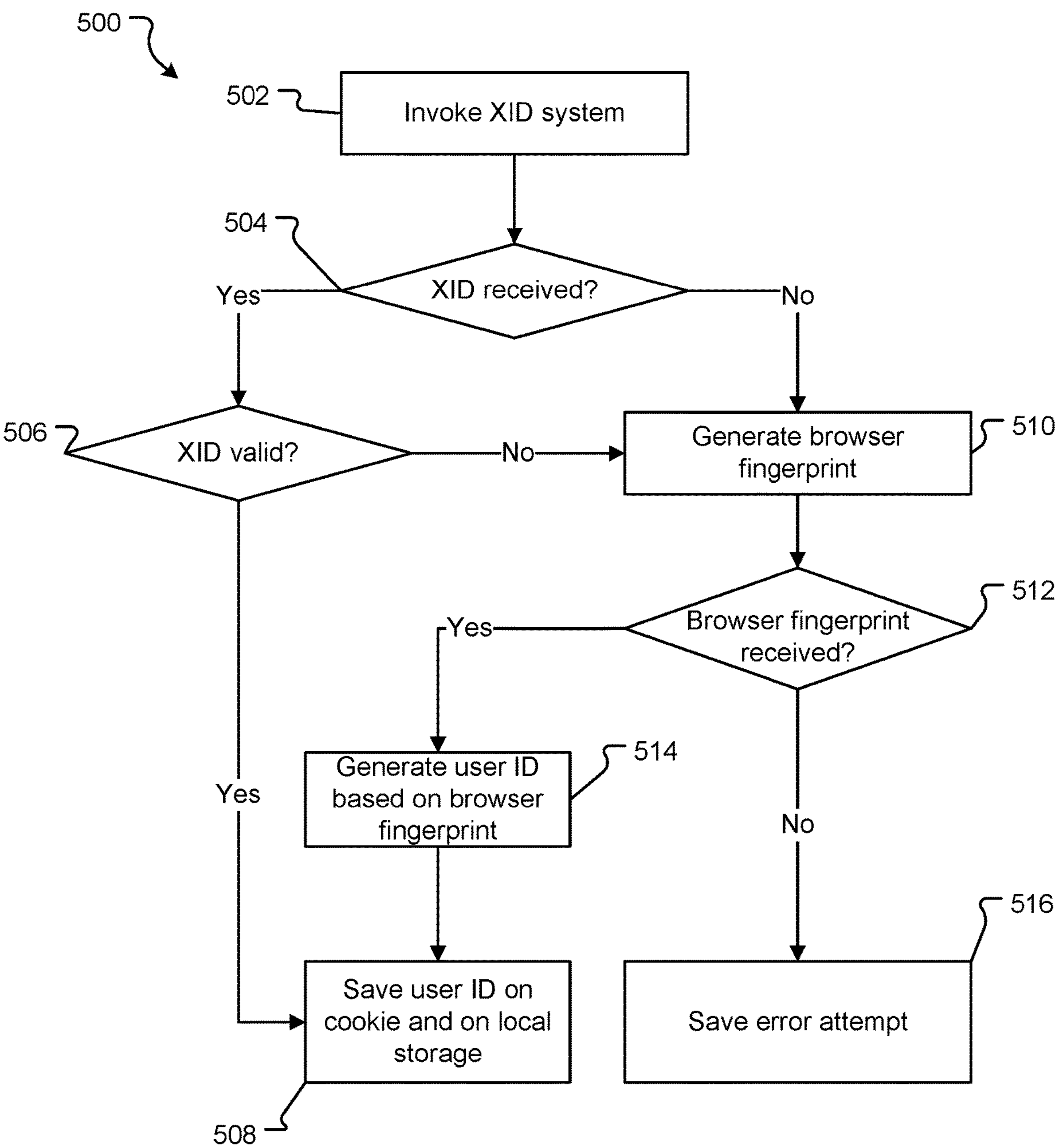
FIG. 5 is a flowchart illustrating an example method for generating a cross domain identifier according to some aspects of the present disclosure.

FIG. 5 illustrates an example method 500 of generating a cross domain identifier for a user. The method 500 is described with reference to the first domain system 110 and the first website 133A. However, it will be appreciated that the same method can be adopted to generate a cross domain identifier for the second domain system 120 and second website 133B or for any other domain system or web page in environment 200. Further, method 500 is described from the perspective of the tracking module 135A and describes step 412 of method 400 in detail.

Method 500 commences at step 502, where the XID system 210 is invoked. In one embodiment, the XID system 210 may be invoked in an iframe within the website 133A. An iFrame is an inline frame used inside a webpage to load another HTML document inside it. This HTML document may also contain JavaScript and/or CSS, which is loaded at the time when the iframe tag is parsed by the web browser 132.

To enable this, the HTML document for the website 133A includes the HTML document for the XID system 210 iFrame. When the HTML document for website 133A is parsed, the HTML document for the iFrame is may also be downloaded and parsed. If at step 406 or 408, the tracking module 135A determines that the cross domain identifier is not present in the local data store 138A or that the identifier has expired, the tracking module 135A parses the HTML document for the iFrame and executes it—which executes XID system 210 within the iFrame. Once the XID system 210 is executed, the XID system 210 attempts to post a cross domain identifier to the main website 133A.

At step 504, the tracking module 135A determines if a cross domain identifier is received from the XID system 210 within a predetermined period. In some cases, the XID system 210 may be unable to communicate the cross domain identifier to the tracking module 135A. This may happen, for example, in cases where the XID system 210 is offline or temporarily unavailable or in cases where there are communication network 202 issues at the client side. In some embodiments, the period of time for which the tracking module 135A waits for the cross domain identifier from the XID system 210 may be set based on the average amount of time it usually takes for the ID to be received or the longest period it takes for the ID to be received. If the period is set too short, the entire process shown in FIG. 5 may be quick and may minimize any impact on the functioning of the main website 133A. However, the downside of a time period that is set too short is that the tracking module 135A may miss receiving cross domain identifiers over slower network connections even if the XID system 210 is online and can generate identifiers. Alternatively, if the period is set too long, the method 500 takes into account even the slowest of network connections and provides the XID system 210 sufficient time to respond. However, this may adversely impact functioning of the parent website 133A. In one example, the predetermined period may be set to two seconds.

If a cross domain identifier is received from the XID system 210 within the predetermined period, the method proceeds to step 506, where the tracking module 135A determines whether the cross domain identifier is valid. In particular, the tracking module 135A may determine whether the cross domain identifier received from the XID system 210 matches the characteristics of a standard cross domain identifier—such as format, character length, etc. For instance, a cross domain identifier may be designed such that it includes 40 hexadecimal characters. If the response received from the XID system 210 does not match this format, the tracking module 135A may determine that an invalid input has been received. Alternatively if the response received from the XID system 210 matches this standard format, the tracking module 135A determines that a valid input has been received. It will be appreciated that this step increases the security of the website 133A and helps discard any spurious responses send by malicious attackers via the iFrame.

If at step 506, the tracking module 135A determines that the cross domain identifier received from the XID system 210 is valid, the method proceeds to step 508 where the tracking module 135A saves the cross domain identifier in a cookie (if the web browser 132 allows cookies) or in the website data store 138A (if the web browser 132 does not allow cookies to be stored on the user device). In other examples, the tracking module 135A may store the cross domain identifier in the cookie and the website data store 138A irrespective of the web browser 132 allowing storage of cookies or not). If the cross domain identifier is 'new', i.e., it has been created for the first time, the tracking module 135A may store the identifier in a newly generated cookie or in a new data pair in the data store 138A. In one example, the information may be stored in the following format—

```
{
type: "XC"
state: "NEW"
value: "AAAA"
createdAt: YEAR-MONTH-DAY
}
```

Alternatively, if an identifier previously existed but was being regenerated due to expiry, the tracking module 135A may update an existing cookie or local storage with the newly generated cross domain identifier and the state of the identifier may indicate 'existing'. If the cross domain identifier matches the expired identifier, the tracking module 135A may simply update the 'created at' field of the identifier. Alternatively, if the cross domain identifier fails to match the expired identifier (e.g., because it is a browser fingerprint based identifier and the underlying browser fingerprint has changed), the tracking module 135A may add the newly generated identifier to the cookie or local storage without deleting any previous identifiers. In one example, the cross domain identifier may be stored in the cookie or local storage in the formats displayed in table A above.

Returning to steps 504 and 506, if at step 504 a response is not received from the XID system 210 within the predetermined period of time or at step 506 it is determined that the response received from the XID system 210 is not valid, the method proceeds to step 510, where the tracking module 135A generates a fingerprint of the web browser 132.

As described previously, to create a browser fingerprint, the web browser 132 is queried to receive certain information about the web browser 132, such as its user agent string (i.e., information that helps identify the browser being used, the version of the browser being used, and the operating system on which the web browser is installed), screen colour depth, language, time zone offset and other capabilities, such as local storage and session storage.

Typically, using the web browser characteristics mentioned above, the accuracy of uniquely identifying a web browser using web browser fingerprinting techniques is anywhere between 50%-94% (depending on the number of parameters utilized for the fingerprint). To improve the accuracy of the browser fingerprint, the tracking module 135A may also query the web browser 132 to determine whether the web browser has a set of predetermined fonts installed. In particular, the tracking module 135A may provide a list of fonts (e.g., 50 fonts) to the web browser 132 and the web browser 132 may respond in the form of I/O or true/false responses where 1 or 'true' indicates that the corresponding font is installed on the web browser 132 and 0 or 'false' indicates that the corresponding font is not installed on the web browser 132.

In addition, the tracking module 135A may perform canvas fingerprinting of the web browser 132. In canvas fingerprinting, the tracking module 135A draws text with random fonts, emojis, and sizes and a random background. The result called canvas pixel data is converted to a Base 64 format. Canvas fingerprinting works on the principle that different web browsers render the same canvas image differently based on reasons at the image format level or system level. At the image format level, the variations can be caused by image processing engines, image export options, and the browser-compression levels. When it comes to the system level, different browsers may render the same image differently because the operating systems come in different fonts and use sub-pixel rendering and anti-aliasing.

In one example, the tracking module 135A may request the information depicted in table B from the web browser 132 as part of the browser fingerprint. It will be appreciated that the data depicted in table B is merely exemplary and that any other features/characteristics of the browser that can be used to distinguish the user's browser from browsers of other users can be used without departing from the scope of the present disclosure.

TABLE B

| example information used as part of browser fingerprint<br>Information requested from web browser |
|---|
| • The default 'eval' length of the browser (e.g., Chrome returns 33, Firefox returns 37, and the length is undefined in Safari). |
| • Whether the browser allows cookies to be stored |
| • The vendor of the web browser |
| • The hardware version of the browser |
| • The language of the browser |
| • The platform on which the web browser is installed (e.g., Windows32) |
| • A list of the plugins installed on the web browser |
| • Date installed |
| • Time zone |
| • Time zone offset from Greenwich Standard Time (GST) |
| • UserAgent |
| • Whether indexed database is available on the web browser |
| • Whether local storage is available on the web browser |
| • Whether session storage is available on the web browser |
| • Whether the web browser is a testing bot |
| • Whether the web browser is a web driver |
| • The web graphics library installed on the web browser |
| • Canvas pixel data based on random text drawn on the web browser |
| • Whether a list of 50 preselected fonts are installed on the web browser |

The response received from the web browser for the requested information is called the browser fingerprint.

Returning to FIG. 5, at 512, the tracking module 135A determines if it was able to generate a fingerprint of the user's browser within a predetermined period (e.g., 3 seconds). There are several reasons as to why the tracking module 135A may not be able to generate a fingerprint of the user's browser within the specified time. For example, the browser prevents/blocks browser fingerprinting, a blocker is installed on the web browser 132 that blocks the browser fingerprint script from loading, a browser extension is installed on the browser 132 that restrict access to certain HTML canvas elements, the web browser 132 does not support one or more JavaScript function calls, or the user device 130 has a slow processor that is unable to generate the browser fingerprint in the predetermined period.

If at step 512, it is determined that the tracking module 135A was able to generate a valid fingerprint of the web browser 132 (e.g., because of any one of the reasons enumerated above), the method proceeds to step 514 where the cross domain identifier is generated based on the browser fingerprint data. As described previously, this involves passing the browser fingerprint data through a hashing function. In one example, the hashing function may be the JavaScript implementation of the Murmur Hash 3 function that generates a 32 bit hash value for the input browser fingerprint data.

At step 508, the tracking module 135A stores the generated cross domain identifier in the website data store 138A for the website 133A. The stored data may have the following format:

```
{
type: "UID"
state: "NEW"
value: "AAAA"
createdAt: YEAR-MONTH-DAY
}
```

The format is the same as described above but the "type" field has a value of "UID," which indicates that the cross domain identifier was generated based on a web browser fingerprint. After the cross domain identifier (XID) has been generated, processing proceeds to step 408.

Returning to step 512, if at this step it is determined that the tracking module 135A could not retrieve browser fingerprint data within the predetermined period of time, the method proceeds to step 516 where the tracking module 135A generates an error message and saves this error message in the data store 138A of the website 133A. The error message may indicate that the cross domain identifier could not be retrieved or generated for the website. The error message may have the following format:

```
{
type: "UID"
state: "TIMEOUT"
}
```

The "type" field has a value of "UID," which indicates that the tracking module 135A attempted to generate a cross domain identifier based on the browser's fingerprint and the state indicates that it was unable to do so within the predetermined period.

Once the domain tracking module 135A has generated the error data, it sends this error data to the web analytics module 136A. The web analytics module 136A is able to determine that the user cannot be identified or have an XID associated with the user based on the error data provided by the tracking module 135A.

In method 500, a browser fingerprint is generated when a cross domain identifier is not received from the XID system 210 at step 504 or if the received XID is not valid at step 506. In some examples, the tracking module 135A may also generate a browser fingerprint in cases where the browser 132 does not allow third party cookies to be stored. For example, the Safari browser blocks third party cookies by default. To account for this situation, the method 500 may include an addition check to determine whether the browser 132 blocks third party cookies. In cases where the tracking module 135A determines that the web browser blocks third party cookies (e.g., because the tracking module 135A failed to write a cookie, received an error message when attempting to write a cookie, or cannot read back a written cookie), the method 500 proceeds to step 510 where a browser fingerprint is generated. Alternatively, if the tracking module 135A determines that third party cookies are not blocked by the web browser 132, and a valid cross domain identifier is received at step 506 the method proceeds to step 508 where the cross domain identifier is stored in a cookie and on local storage 138A.

Further still, in some embodiments, at step 510, the tracking module 135A may log the error attempt in the cross domain identifier record along with the corresponding state of the cross domain identifier. For example, if the tracking module 135A gracefully fails when attempting to write the cookie, the state of the cross domain identifier type 'XC' may be recorded as 'UNAVAILABLE.' Alternatively, if the web browser throws an exception when the tracking module 135A attempts to set the cookie with the cross domain identifier, the state of the cross domain identifier type 'XC' may be recorded as 'ERROR'

Figure 6:
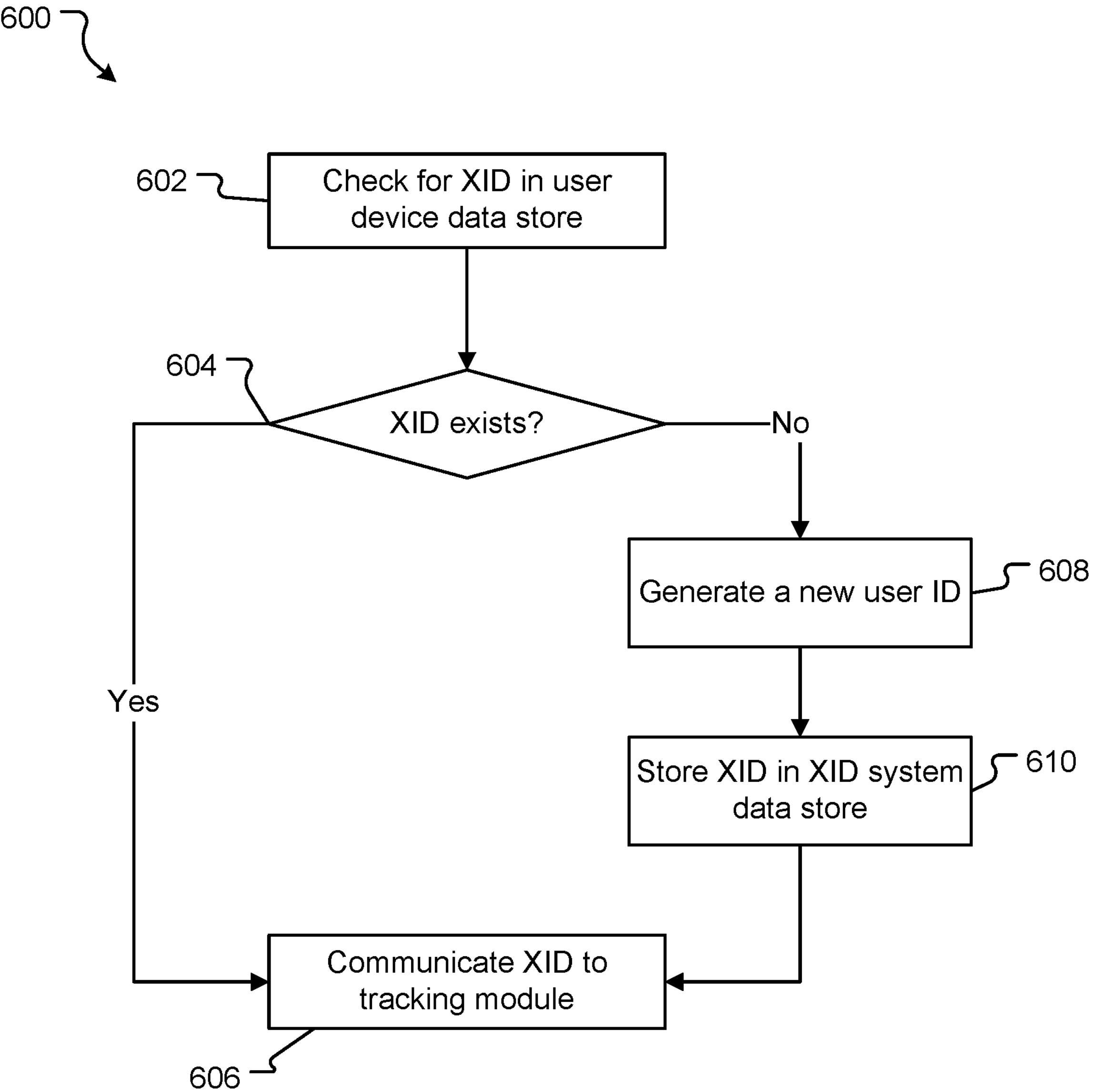
FIG. 6 is a flowchart illustrating an example method for generating a cross domain identifier by a cross domain identifier system according to some aspects of the present disclosure.

FIG. 6 is a flowchart illustrating an example method 600 performed by the XID system 210 to communicate the cross domain identifier to the tracking module 135A at step 502 of method 500.

As described previously, the tracking module 135A invokes the XID system 210, e.g., by executing it in an iFrame of website 133A. While, being executed in the iFrame, the XID system 210 may communicate and pass information to the tracking module 135A via PostMessages.

The method 600 commences at step 602, where the XID system 210 determines if a cross domain identifier exists for the current web browser. To this end, the XID system 210 may check if a cookie is stored for the XID in the web browser 132 and/or inspects the XID system data store 138C to check if any cross domain identifiers exist. For example, the XID system 210 reads cookies stored in the web browser by the XID system 210 by using the JavaScript command DOCUMENT.COOKIE( ) If no cookie values are returned for this call, the XID system may inspect the local storage 138C for the cross domain identifier using a GET command.

As discussed above, organisations may have multiple web domains directed to different products and/or services they offer. Each of these domains may be independent of each other but are related because they are all owned by the same organisation. The XID system 210 may determine if a cross domain identifier is stored in the data store 134, e.g., in a cookie or in website specific data store 138C for example when method 600 was executed for any other related domain. As an example, the user may have previously visited a webpage of the second domain 120 and, as a result, a cross domain identifier may have been generated for the user and stored in a cookie and/or website specific data store 138B and in XID system's data store 138C in accordance with the methods described herein.

At step 604, the XID system 210 is configured to query the data store 138C (associated with the XID system) and/or query a cookie on that domain to retrieve a cross domain identifier.

In response, the web browser 132 may either inform the XID system 210 that no cross domain identifier or cookie exists in the data store 138C or it may provide the cross domain identifier. In one example, the XID system 210 may receive the following response in case a cross domain identifier does not exist for the user in the XID system data store 138C— "id":null,"timestamp":1587528023790.

Alternatively, if a cross domain identifier exists in the data store 138C, the XID system 210 may receive the following response—"id":"cce86c6f-e297-420a-8bdc-ff605960c06d", "timestamp":1587529081710, where "cce86c6f-e297-420a-8bdc-ff605960c06d" is the cross domain identifier.

At step 604, if the XID system 210 receives a cross domain identifier in response to querying the data store 138C, the method proceeds to step 606 where the XID system 210 passes the cross domain identifier to the tracking module 135A. In one embodiment, the cross domain identifier may be communicated to the main website 133A (and the tracking module 135A) via a POST message (e.g., PostMessage {"id":"cce86c6f-e297-420a-8bdc-ff605960c06d","timestamp":1587529081710}. The XID system 210 may also update the timestamp of the cross domain identifier in the data store 138C at this step. This may be done so that the XID does not expire.

Alternatively, if at step 606, the XID system 210 does not receive any cross domain identifiers from the data store 138C (e.g., because the user has not yet visited other domains, a cross domain identifier has not successfully been stored as yet, and/or the user has deleted all cookies and cleaned the web browser data store 134), the method proceeds to step 608 where the XID system 210 generates a new cross domain identifier. At step 608, this new cross domain identifier is communicated to the tracking module 135A (e.g., via a postMessage). In one example, the cross domain identifier has a format similar to a version 4 universally unique identifier (UUID) that is generated using a random number generator. An example of a cross domain identifier generated in this manner is 9e2de568-2d71-4526-900f-1e8675acd1a7.

Next, at step 610, the XID system 210 stores the newly generated cross domain identifier in the XID system's data store 138C before the method returns to step 606.

Figure 7:
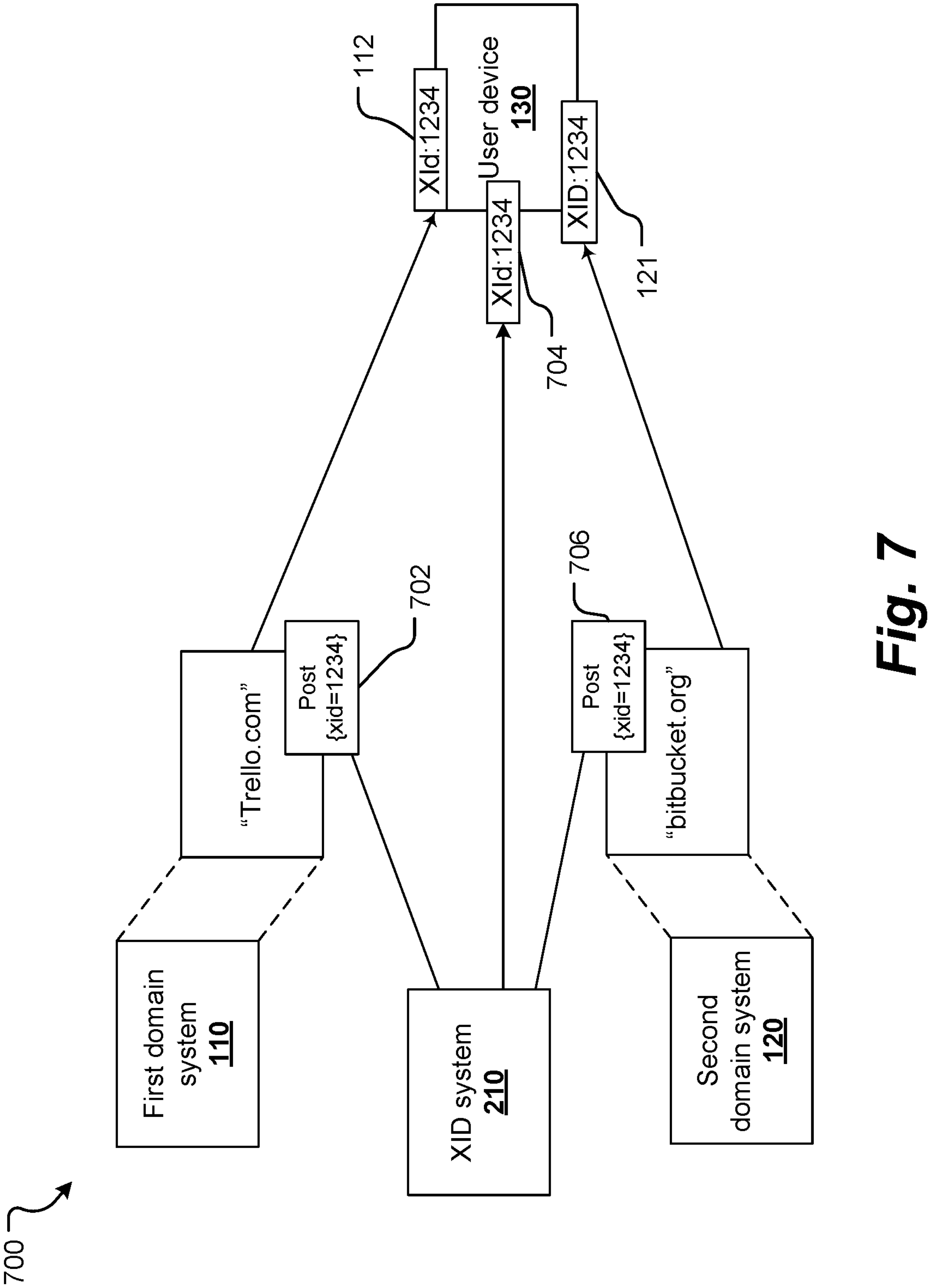
FIG. 7 is a block diagram illustrating an example process for communicating a cross tracking identifier to two domains according to some aspects of the present disclosure.

FIG. 7 illustrates an example for using the same cross domain identifier across two domains using the methods described above with respect to FIGS. 4-6. The example depicted in FIG. 7 is similar to the example described in FIG. 1—i.e., an organization including two domains systems 110, 120, each providing a different website to the user of user device 130. In the example shown in FIG. 7, the user first visits the website "trello.com" offered by the first domain system 110. The website "trello.com" first checks if an XID exists in the website's local data store on the user device 130. If the website determines that an XID does not exist in this data store, it invokes the XID system via an iFrame 702. The XID system 210 inspects its own data store on the user device 130 to check if any XIDs are stored. In this example, the XID system 210 does not find any stored XIDs and therefore generates a new XID, "xid=1234", stores this XID in its own local data store (as cookie 704) on the user device 130 and communicates the XID to trello.com via the iFrame 702. Trello.com saves this XID in its own cookie 112 and communicates it to its web analytics module for adding to event logs.

Next, the user visits the website bitbucket.org offered by the second domain system 120. As with the first case, bitbucket.org first checks its own local data store on the user device 130 to check if an XID exists. If the XID does not exist, it also invokes the XID system 210 via an iFrame 706. the XID system 210 then checks its local data store on the user device and finds the cookie 704 that includes the XID '1234' it had previously stored on the device. The XID system 210 then communicates this XID to the website "bitbucket.org" via the iFrame 706, which stores the XID in its own cookie 121.

In this manner, once a cross domain identifier is generated for the first time it is stored in the data store for the XID system 210 and the XID system 210 can retrieve the cross domain identifier from this data store wherever it is invoked by a domain system and communicate it to the tracking module of the requesting domain system. Accordingly, once the cross domain identifier is generated, the same identifier can be used by all the domain systems in the environment 200 to identify the user and the event platform 220 can track the user across different domains based on the cross domain identifier.

In the methods 400-600 described above, it is assumed that the cross domain identifier generated by the XID system has an expiry date, however this is not necessary. In some examples, the cross domain identifier may not have any expiry period. In such cases, if at step 406, the tracking module 135A determines that the cross domain identifier is received from the XID system 210 it may forgo step 408, proceeding directly to step 410.

Although browser fingerprinting techniques provide sufficient accuracy and can uniquely identify users up to 95% of the time, generating browser fingerprints is computationally expensive. Typically, generating browser fingerprints can take about 300 ms and in some cases, this process may take up to 1-2 seconds and may affect the rendering of the parent website. Accordingly, to minimize the impact of cross domain identifiers on the web browser resources and rendering of the parent website, the browser fingerprint mechanism for generating the cross domain identifier is only employed if the system is unable to receive a cross domain identifier from the XID system 210.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart operation could potentially be performed in various different ways and by various different systems or applications. Furthermore, it may be possible for a given flowchart operation to be divided into multiple operations and/or multiple flowchart operations to be combined into a single operation. Furthermore, in some instances the order of the steps may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. A computer-implemented method comprising:

receiving webpage data at a user device for a first webpage hosted on a first web domain requested by the user device, the webpage data comprising a first tracking module;

loading the first tracking module;

determining, by the first tracking module, whether a cross domain identifier for the first webpage is available on the user device;

in response to determining that the cross domain identifier for the first webpage is available on the user device:

retrieving, by the first tracking module, the cross domain identifier from a cookie if cookies are allowed to be stored on the user device or a local data store associated with the first webpage in the user device if cookies are not allowed to be stored on the user device;

in response to determining that the cross domain identifier for the first webpage is not available on the user device:

obtaining the cross domain identifier for the first webpage from a cross domain identifier system via a first iFrame that invokes the cross domain identifier system and is included in the first webpage; or generating, by the first tracking module, a new cross domain identifier based on a browser fingerprint of the user device and making the new cross domain identifier accessible to the cross domain identifier system when invoked;

in response to receiving a request to display a second webpage at the user device:

loading a second tracking module and a second iFrame of the second webpage;

invoking, via the second iFrame, the cross domain identifier system; and querying, via the second iFrame, the cross domain identifier system to obtain the new cross domain identifier for the second webpage.

2. The computer-implemented method of claim 1, wherein determining that the cross domain identifier for the first webpage is available on the user device comprises determining that the cross domain identifier for the first webpage is present in a cookie associated with the first webpage or present in a local data store for the first webpage in the user device.

3. The computer-implemented method of claim 1, wherein obtaining the cross domain identifier for the first webpage from the cross domain identifier system includes the first tracking module loading the cross domain identifier in the first iFrame and receiving the cross domain identifier from the cross domain identifier system via the first iFrame.

4. The computer-implemented method of claim 3, wherein obtaining the cross domain identifier from the cross domain identifier system further comprises:

determining, by the cross domain identifier system, whether the cross domain identifier is available on the user device; and in response to determining by the cross domain identifier system that the cross domain identifier is not available on the user device:

generating, by the first tracking module, the new cross domain identifier;

saving the new cross domain identifier on the user device; and communicating the new cross domain identifier to the cross domain identifier system using the first tracking module.

5. The computer-implemented method of claim 4, wherein saving the new cross domain identifier on the user device comprises saving the new cross domain identifier in a cookie associated with the first webpage and the cross domain identifier system or in a local data store for the first webpage and the cross domain identifier system, the local data store in the user device.

6. The computer-implemented method of claim 1, wherein the first tracking module generates the new cross domain identifier based on the browser fingerprint of the user device when the first tracking module fails to receive the cross domain identifier from the cross domain identifier system.

7. The computer-implemented method of claim 1, further comprising:

determining whether a web browser of the user device blocks third party cookies; and upon determining that the web browser blocks third party cookies, generating the new cross domain identifier based on the browser fingerprint of the user device.

8. The computer-implemented method of claim 1, wherein generating the new cross domain identifier based on the browser fingerprint of the user device comprises determining whether one or more of a set of predetermined fonts are installed on a web browser of the user device.

9. The computer-implemented method of claim 1, further comprising:

receiving webpage data at the user device for the second webpage, the second webpage hosted on a second domain, the webpage data for the second webpage comprising the second tracking module;

determining by the second tracking module whether the new cross domain identifier is available for the second webpage on the user device;

in response to determining that the new cross domain identifier is available for the second webpage on the user device, retrieving, by the second tracking module, the new cross domain identifier for the second webpage from the user device;

in response to determining that the new cross domain identifier is not available for the second webpage on the user device, obtaining the new cross domain identifier for the second webpage from the cross domain identifier system.

10. The computer-implemented method of claim 9, wherein determining that the new cross domain identifier is available for the second webpage on the user device comprises determining that the new cross domain identifier is present in a cookie associated with the second webpage or present in a local data store of the second webpage in the user device.

11. A user device comprising:

a processing unit;

non-transitory computer readable memory comprising instructions, which when executed by the processing unit cause the user device to:

receive webpage data for a first webpage hosted on a first web domain, the webpage data comprising a first tracking module;

load the first tracking module, the first tracking module configured to:

determine whether a cross domain identifier for the first webpage is available on the user device;

in response to determining that the cross domain identifier for the first webpage is available on the user device, retrieve, by the first tracking module, the cross domain identifier from a cookie if cookies are allowed to be stored on the user device or a local data store associated with the first webpage in the user device if cookies are not allowed to be stored on the user device;

in response to determining that the cross domain identifier for the first webpage is not available on the user device:

obtain the cross domain identifier for the first webpage from a cross domain identifier system via a first iFrame that invokes the cross domain identifier system and is included in the first webpage; or generate, at the user device, a new cross domain identifier based on a browser fingerprint of the user device;

make the new cross domain identifier for the first webpage accessible to the cross domain identifier system when invoked;

in response to receiving a request to display a second webpage at the user device:

loading a second tracking module and a second iFrame of the second webpage;

invoking, via the second iFrame, the cross domain identifier system; and querying, via the second iFrame, the cross domain identifier system to obtain the new cross domain identifier for the second webpage.

12. The user device of claim 11, wherein to determine that the cross domain identifier for the first webpage is available on the user device, the first tracking module is configured to inspect a cookie associated with the first webpage or a local data store of the first webpage on the user device.

13. The user device of claim 11, wherein to obtain the cross domain identifier for the first webpage from the cross domain identifier system, the first tracking module is configured to load the cross domain identifier in the first iFrame and receive the cross domain identifier from the cross domain identifier system via the first iFrame.

14. The user device of claim 13, wherein to obtain the cross domain identifier, the cross domain identifier system is configured to:

determine whether the cross domain identifier is available on the user device; and in response to determining that the cross domain identifier is not available on the user device, cause the first tracking module to:

generate the new cross domain identifier;

save the new cross domain identifier on the user device; and communicate the new cross domain identifier to the cross domain identifier system.

15. The user device of claim 14, wherein saving the new cross domain identifier on the user device comprises saving the new cross domain identifier in a cookie associated with the first webpage and the cross domain identifier system or in a local data store for the first webpage and the cross domain identifier system, the local data store in the user device.

16. The user device of claim 11, wherein the first tracking module is configured to generate the new cross domain identifier based on the browser fingerprint of the user device when the first tracking module fails to receive the cross domain identifier from the cross domain identifier system.

17. The user device of claim 11, wherein the first tracking module is further configured to:

determine whether a web browser of the user device blocks third party cookies; and upon determining that the web browser blocks third party cookies, generate the new cross domain identifier based on the browser fingerprint of the user device.

18. The user device of claim 11, wherein to generate the new cross domain identifier based on the browser fingerprint of the user device, the first tracking module is further configured to determine whether one or more of a set of predetermined fonts are installed on a web browser of the user device.

19. The user device of claim 11, wherein when executed the instructions are further configured to:

receive webpage data for the second webpage, the second webpage hosted on a second domain, the webpage data for the second webpage comprising the second tracking module;

load the second tracking module, the second tracking module configured to:

determine whether the new cross domain identifier is available for the second webpage on the user device;

in response to determining that the new cross domain identifier for the second webpage is available on the user device, retrieve the new cross domain identifier for the second webpage from the user device;

in response to determining that the new cross domain identifier is not available for the second webpage on the user device, obtain the new cross domain identifier for the second webpage from the cross domain identifier system.

20. The user device of claim 19, wherein to determine that the new cross domain identifier is available for the second webpage on the user device, the second tracking module is configured to inspect a cookie associated with the second webpage or a local data store of the second webpage in the user device.

21. The user device of claim 11, wherein the first web domain is associated with a first web-enabled application, a second web domain that provides the second webpage is associated with a second web-enabled application, the first web-enabled application is one of a set of multiple web-enabled applications, and the second web-enabled application is another one of the set of multiple web-enabled applications.

22. The user device of claim 21, wherein the set of multiple web-enabled applications include at least an issue tracking system and a software code management system.

23. The user device of claim 21, wherein the first web-enabled application and the second web-enabled application are provided by a common service provider.

* * * * *